(12) United States Patent
Kim et al.

(10) Patent No.: US 9,239,398 B2
(45) Date of Patent: Jan. 19, 2016

(54) METHOD OF GENERATING AND COMBINING MULTIPLE HORIZONS TO DETERMINE A SEISMIC HORIZON AND ITS UNCERTAINTY

(71) Applicants: Chul-Sung Kim, Houston, TX (US); Mark W. Dobin, The Woodlands, TX (US)

(72) Inventors: Chul-Sung Kim, Houston, TX (US); Mark W. Dobin, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 363 days.

(21) Appl. No.: 13/651,204

(22) Filed: Oct. 12, 2012

(65) Prior Publication Data
US 2013/0121111 A1    May 16, 2013

Related U.S. Application Data

(60) Provisional application No. 61/558,785, filed on Nov. 11, 2011.

(51) Int. Cl.
*G01V 1/30* (2006.01)

(52) U.S. Cl.
CPC .......... *G01V 1/301* (2013.01); *G01V 2210/643* (2013.01)

(58) Field of Classification Search
USPC .......................................................... 367/73
See application file for complete search history.

(56) References Cited

U.S. PATENT DOCUMENTS

| | | | | |
|---|---|---|---|---|
| 5,153,858 | A * | 10/1992 | Hildebrand | 367/72 |
| 5,251,184 | A * | 10/1993 | Hildebrand et al. | 367/72 |
| 5,432,751 | A * | 7/1995 | Hildebrand | 367/72 |
| 5,615,171 | A * | 3/1997 | Hildebrand | 367/72 |
| 6,446,006 | B1 | 9/2002 | Thore | |
| 6,674,689 | B2 * | 1/2004 | Dunn et al. | 367/43 |
| 7,024,021 | B2 * | 4/2006 | Dunn et al. | 382/109 |
| 7,330,791 | B2 * | 2/2008 | Kim et al. | 702/16 |
| 7,565,243 | B2 * | 7/2009 | Kim et al. | 702/2 |
| 8,213,261 | B2 * | 7/2012 | Imhof et al. | 367/38 |
| 8,360,144 | B2 * | 1/2013 | Imhof | 166/250.01 |
| 8,370,122 | B2 * | 2/2013 | Walker et al. | 703/10 |
| 8,447,524 | B2 * | 5/2013 | Chen et al. | 702/16 |
| 8,694,262 | B2 * | 4/2014 | Schultz et al. | 702/18 |
| 2003/0193838 | A1 * | 10/2003 | Dunn et al. | 367/68 |
| 2004/0062145 | A1 * | 4/2004 | Dunn et al. | 367/72 |
| 2007/0078604 | A1 * | 4/2007 | Kim et al. | 702/16 |

(Continued)

FOREIGN PATENT DOCUMENTS

WO    WO 2010/047856    4/2010

OTHER PUBLICATIONS

International Search Report for PCT/US2012/060110. World Intellectual Property Organization. Jan. 9, 2013 (5 pages).*

*Primary Examiner* — James Hulka
(74) *Attorney, Agent, or Firm* — ExxonMobil Upstream Research Company, Law Dept.

(57) ABSTRACT

There is provided a system and method for creating model of a subsurface region based on multiple depth values. The method includes selecting seeds that represent a starting location within a desired horizon surfaces and generating a plurality of candidate horizons from the selected seeds. A number of depth values from the candidate horizons may be combined into a representative depth value and an uncertainty may be computed based on discrepancies among the depth values. A model of the subsurface region may be created using the depth values and the uncertainty.

20 Claims, 11 Drawing Sheets

(56) References Cited

U.S. PATENT DOCUMENTS

| | | |
|---|---|---|
| 2008/0071477 A1 | 3/2008 | Li et al. |
| 2008/0154505 A1* | 6/2008 | Kim et al. .................. 702/2 |
| 2008/0285384 A1 | 11/2008 | James |
| 2010/0149917 A1* | 6/2010 | Imhof et al. ............... 367/53 |
| 2010/0161232 A1 | 6/2010 | Chen et al. |
| 2010/0274543 A1* | 10/2010 | Walker et al. .............. 703/6 |
| 2010/0332139 A1* | 12/2010 | Bruun et al. ............... 702/18 |
| 2011/0002194 A1* | 1/2011 | Imhof et al. ............... 367/53 |
| 2011/0042098 A1* | 2/2011 | Imhof ...................... 166/369 |
| 2012/0173149 A1* | 7/2012 | Loseth et al. .............. 702/11 |
| 2013/0046476 A1* | 2/2013 | Schultz et al. ............. 702/18 |

* cited by examiner

400

406

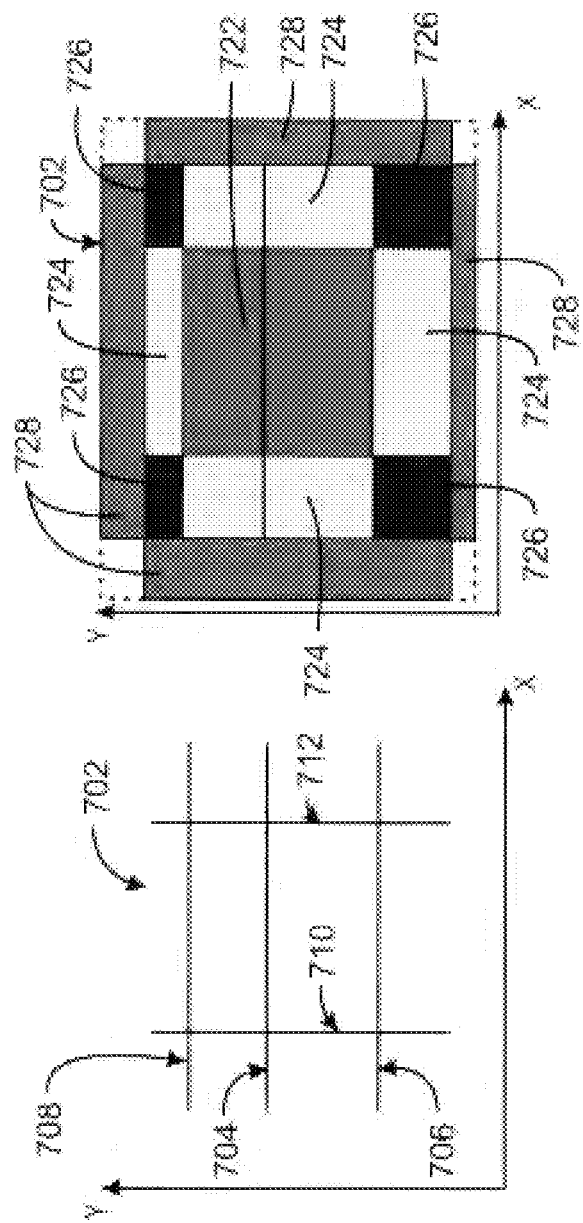

800

810

METHOD OF GENERATING AND COMBINING MULTIPLE HORIZONS TO DETERMINE A SEISMIC HORIZON AND ITS UNCERTAINTY

CROSS-REFERENCE TO RELATED APPLICATION

This application claims the benefit of U.S. Provisional Patent Application 61/558,785 filed Nov. 11, 2011 entitled METHOD OF GENERATING AND COMBINING MULTIPLE HORIZONS TO DETERMINE A SEISMIC HORIZON AND ITS UNCERTAINTY, the entirety of which is incorporated by reference herein.

FIELD OF THE INVENTION

The present techniques relate to an interactive tool for seismic horizon interpretation. In particular, exemplary embodiments of the present techniques relate to a system and method for generating candidate horizons, combining the candidate horizons, and computing an uncertainty or consistency associated with the resulting combined horizon.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Seismic interpretation generally involves a person skilled in geologic interpretation, referred to as an interpreter, who manually identifies seismic horizons by reviewing seismic reflections and mapping the seismic reflections into seismic horizons. A seismic horizon may include boundaries in the subsurface structures that are deemed important by an interpreter. Finding the seismic horizon can be a subjective, time consuming process.

Tool sets for computer-aided volume interpretation typically include horizon tracking techniques that are used to determine seismic horizons. One horizon tracking technique may follow the peaks of seismic amplitudes, beginning with a user provided seed point in a vertical seismic section. The vertical seismic section can be either a cross-line vertical section in the y-z plane or an in-line vertical section in the x-z plane.

Another horizon tracking technique is known as "seed detection," which is a technique for growing a region in a three dimensional seismic data volume. Seed detection may result in a set of connected voxels in a 3D seismic data volume that fulfills user-specified attribute criteria. To find the set of connected voxels, seed detection may begin with a point in a data volume that connects with admissible neighbors in order to fully define the connected voxels. Admissible neighbors are the points that meet some user defined criteria that surround the starting point. The new points are added to the current connected voxels and the procedure continues until it reaches a point where no further admissible neighbors exist.

An example of a horizon tracking technique is discussed in United States Patent Application Publication No. 2008/0285384 by James. The application discloses a seed picking algorithm that can use a first point for picking a set of second points from a data set. Each of the points in the set of second points can be redefined as the first point, and the algorithm may repeat. An iteration number or other attribute can be assigned to the points and the iteration number can correspond to the number of times the algorithm has been repeated to process the point. The attribute or a number of attributes can be displayed as a visual characteristic for each point. An iterative process can be applied to a set of seismic data points, starting at a seed data point and finding a set of next iteration seed points from the set of points neighboring the seed point, continuing only with next iteration seed points. The number of points that are found by the process when the point is used as a seed data point can be recorded for each of a set of data points.

International Patent Application Publication No. 2010/047856 by Mark Dobin et al. discloses a method and system that may identify a geologic object through cross sections of a geologic data volume. The method includes obtaining a geologic data volume having a set of cross sections. Then, two or more cross sections can be selected, and a transformation vector can be estimated between the cross sections. Based on the transformation vector, a geologic object can be identified within the geologic data volume.

The existing techniques described above tend to find geologic objects, including horizons, without addressing the uncertainty or consistency associated with the resulting geologic objects. Even when multiple seeds are used, the existing techniques offer little insight to the relationships or consistencies among the seeds.

SUMMARY

An exemplary embodiment of the present techniques provides a method of generating and combining multiple horizons to determine a seismic horizon and its uncertainty. The method includes selecting seeds that represent a starting location within a desired horizon surface and generating plurality of candidate horizons from the selected seeds. Depth values from the plurality of candidate horizons are combined into a representative depth value and uncertainty can be computed based on the discrepancies among the depth values. A model of the subsurface region may be created using the depth values and uncertainty.

An exemplary embodiment of the present techniques provides a system that includes a processor and a tangible, machine-readable storage medium that stores machine-readable instructions for execution by the processor. The machine-readable instructions include code that, when executed by the processor, is configured to select seeds that represent a starting location within a desired horizon surface and generate a plurality of candidate horizons from the selected seeds. The code may, when executed by the processor, be configured to cause the processor to combine depth values from the plurality of candidate horizons into a representative depth value, and compute an uncertainty based on discrepancies among the plurality of the depth values. Additionally, the code may, when executed by the processor, be configured to cause the processor to render a model of the subsurface region using the depth values and the uncertainty.

An exemplary embodiment of the present techniques provides a non-transitory, computer readable medium comprising code configured to direct a processor to select seeds that represent a starting location within a desired horizon surface and generate a plurality of candidate horizons from the selected seeds. The non-transitory, computer readable medium may also comprise code configured to direct a processor to combine depth values from the plurality of candidate horizons into a representative depth value, and compute an uncertainty based on discrepancies among the plurality of the depth values. Additionally, the non-transitory, computer readable medium may comprise code configured to direct a processor to create a model of the subsurface region using the depth values and the uncertainty.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Advantages of the present techniques may become apparent upon reviewing the following detailed description and drawings of non-limiting examples of embodiments in which:

FIG. 7A is a map view showing an area with multiple in-lines and cross-lines as according to an embodiment of the present techniques;

FIG. 7B is a map view showing the number of depth values available at each x-y location based on the interpretation line segments in multiple in-lines and cross-lines in FIG. 7A according to an embodiment of the present techniques;

DETAILED DESCRIPTION

Figure 1:
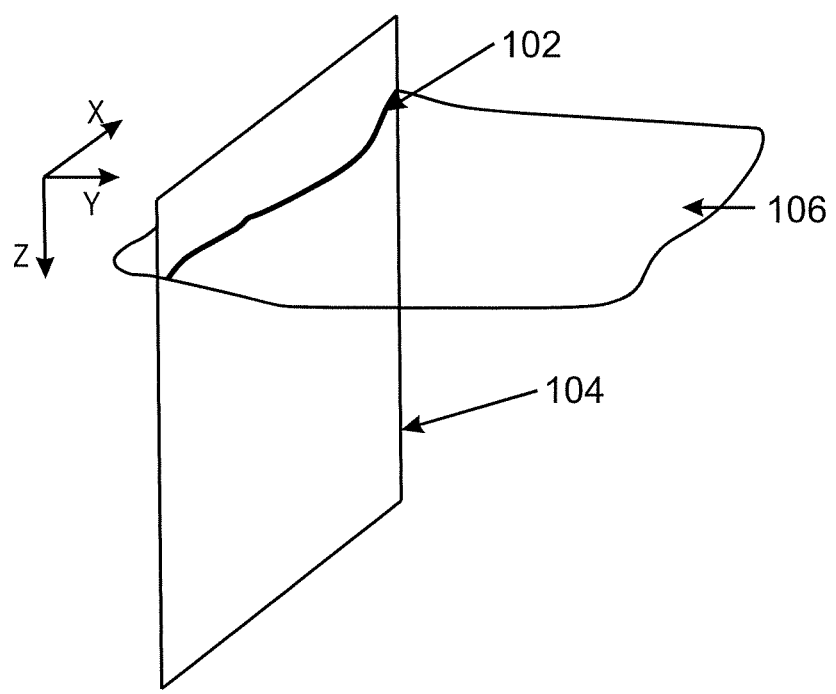
FIG. 1 is a diagram showing a 3D horizon surface according to an embodiment of the present techniques.

In the following detailed description section, specific embodiments are described as examples. However, to the extent that the following description is specific to a particular embodiment or a particular use, this is intended to be for exemplary purposes only and simply provides a description of the exemplary embodiments. Accordingly, the present techniques are not limited to embodiments described herein, but rather, the present techniques include all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

The term "coordinates" refers to Cartesian coordinates with the x coordinate as the in-line direction, and the y coordinate as the cross-line direction, and the z coordinate as the time or depth, where the direction is taken to be vertical and orthogonal to x and y.

The term "cross-line" refers to a seismic section or seismic line that is perpendicular to the original seismic line. The y coordinate typically represents the cross-line direction.

The term "horizon" refers to a geologic boundary in the subsurface structures that are deemed important by an interpreter. Marking these boundaries is done by drawing lines on a seismic section, generally by personnel who are interpreting the seismic volumes. Each line represents the presence of an interpreted surface at that location. An interpretation project typically generates hundreds of such interpretation lines. Further, horizons may be rendered using different colors so that they stand out in a 3D visualization of data.

The term "in-line" refers to a seismic section or seismic line that is parallel to the original seismic line in the direction in which the seismic data was collected. The x coordinate typically represents the in-line direction.

The term "interpreter" refers to a person skilled in seismic exploration data interpretation. An interpreter is often principally responsible for the development of an exploration prospect.

The term "seed" refers to a voxel or a set of voxels within a seismic volume. As used herein, a seed could be a single point or a set of points that form a line segment in a vertical cross section.

The term "seismic data" refers to a multi-dimensional matrix or grid containing information about points in the subsurface structure of a field, where the information was obtained using seismic methods. Seismic data typically is represented using a structured grid. Seismic attributes or properties can be represented in individual cells or volume pixels (voxels). Seismic data may be volume rendered with opacity or texture mapped on a surface.

The term "seismic line" refers to a collection of seismic data containing an ordered list of points within a 2D section defined by x and y coordinates.

The term "seismic volume" refers to particular seismic data defined at locations in a three dimensional 3D representation of seismic data. Thus, data may be represented as a multi-dimensional matrix of values, wherein three coordinates are used to represent the 3D location of a particular data volume in space, such as x, y, and z, and numerous additional terms may be used to represent specific physical attributes associated with the volume, such as amplitude, velocity, density, seismic attributes, and the like.

The term "voxel," or volume pixel, refers to the smallest data point in a 3D volumetric object. Each voxel has a unique set of coordinates and contains one or more data values that represent the properties at that location. Each voxel represents a discrete sampling of a 3D space, similar to the manner in which pixels represent sampling of the 2D space. The location of a voxel can be calculated by knowing the grid origin, unit vectors, and the indices of the voxel. Each voxel can be expressed in the form (x, y, z, data value) where "x, y, z" identifies the 3D location of the point within the volume.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Overview

Computer-aided tools may be used for fast interpretation of seismic horizon surfaces. However, traditional computer aided interpretation tools for tracking seismic horizons can be limited in use due to the resulting seismic horizon becoming unreliable when data quality is low. Further, a determination of the seismic horizon can be ambiguous due to complex geologic structures such as faults, channels, and seismic facies. Moreover, these computer-aided interpretation tools may not assist the user in verifying the reliability of horizon tracking results provided by the tool itself. As a result, users may manually check the consistency and accuracy of each in-line and cross-line in a time consuming process.

In embodiments, multiple seeds can be used to generate multiple surfaces as candidate horizons. Additionally, embodiments provide a method for combining multiple candidate horizons, and computing the uncertainty associated with the combined horizon surface. The uncertainty may be used to create an uncertainty map that can guide the user in adding interpretation lines to further refine the combined horizon surface. The uncertainty map may also indicate to the user when the horizon is complete by visualizing the degree of uncertainty or consistency associated with the horizon surface.

FIG. 1 is a diagram 100 showing a 3D horizon surface according to an embodiment of the present techniques. An interpretation line segment is a line segment that may be used as a seed within a 3D volume. At reference number 102, an interpretation line segment is shown in an in-line cross section 104. From the interpretation line segment 102, a 3D horizon surface may be constructed that extends across each y value. The 3D horizon surface may be constructed using any seismic horizon tracking method. The entire horizon surface is shown at reference number 106. One interpretation line segment may be considered one seed or one set of seeds, as the entire interpretation line segment can be used for horizon tracking. Horizon tracking may also occur when a user provides a single point as a seed instead of an interpretation line segment. Additionally, interpretation line segments may have differing lengths and may not be limited to an in-line or cross-line vertical seismic section. Further, the seeds can be in the form interpretation patches or a set of interpretation points.

Figure 2:
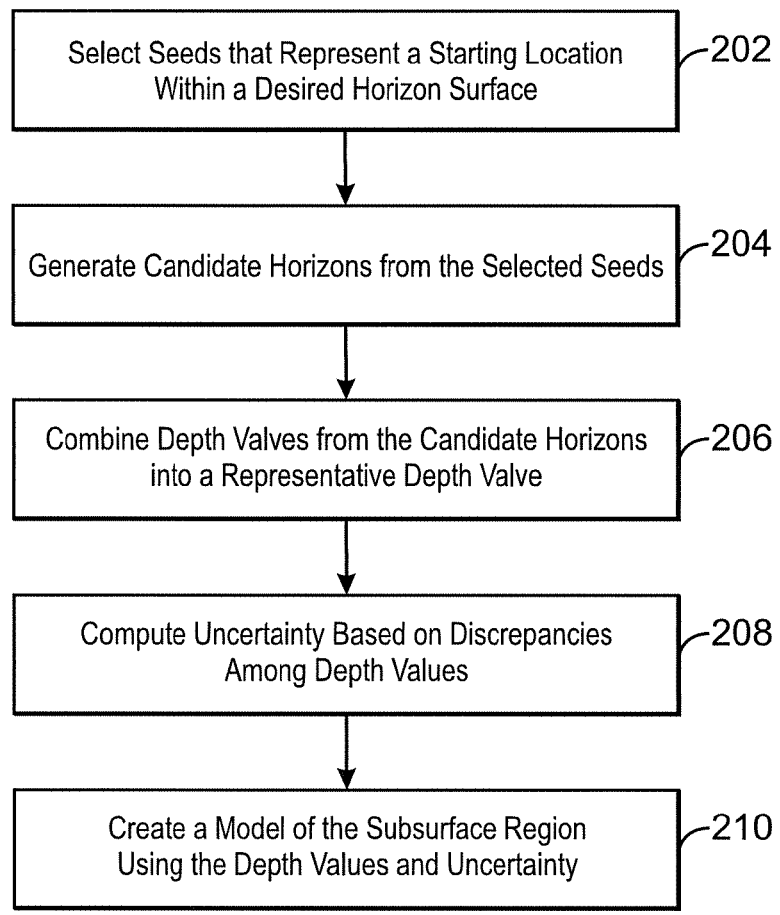
FIG. 2 is a process flow diagram summarizing a method of creating a model of a subsurface region based on multiple depth values according to an embodiment of the present techniques.

FIG. 2 is a process flow diagram 200 summarizing a method of creating a model of a subsurface region based on multiple depth values according to an embodiment of the present techniques. At block 202, seeds may be selected at locations that belong to a desired horizon surface. The desired horizon surface is a surface where a user wants to locate a horizon. The seeds may be in the form of points, voxels, or interpretation line segments within a 3D seismic volume. Accordingly, one interpretation line segment may be considered one seed or one set of seeds.

At block 204, a number of candidate horizons may be generated from the selected seeds. In embodiments, the multiple candidate horizons can be used to obtain multiple z values, or depth values, at each x-y location within an area. At block 206, multiple depth values from multiple candidate horizons may be combined into a representative depth value.

At block 208, an uncertainty value may be computed. The uncertainty may be based on the discrepancies among the multiple depth values. At block 210, a model of the subsurface region may be created or rendered using the depth values and uncertainty.

Figure 3:
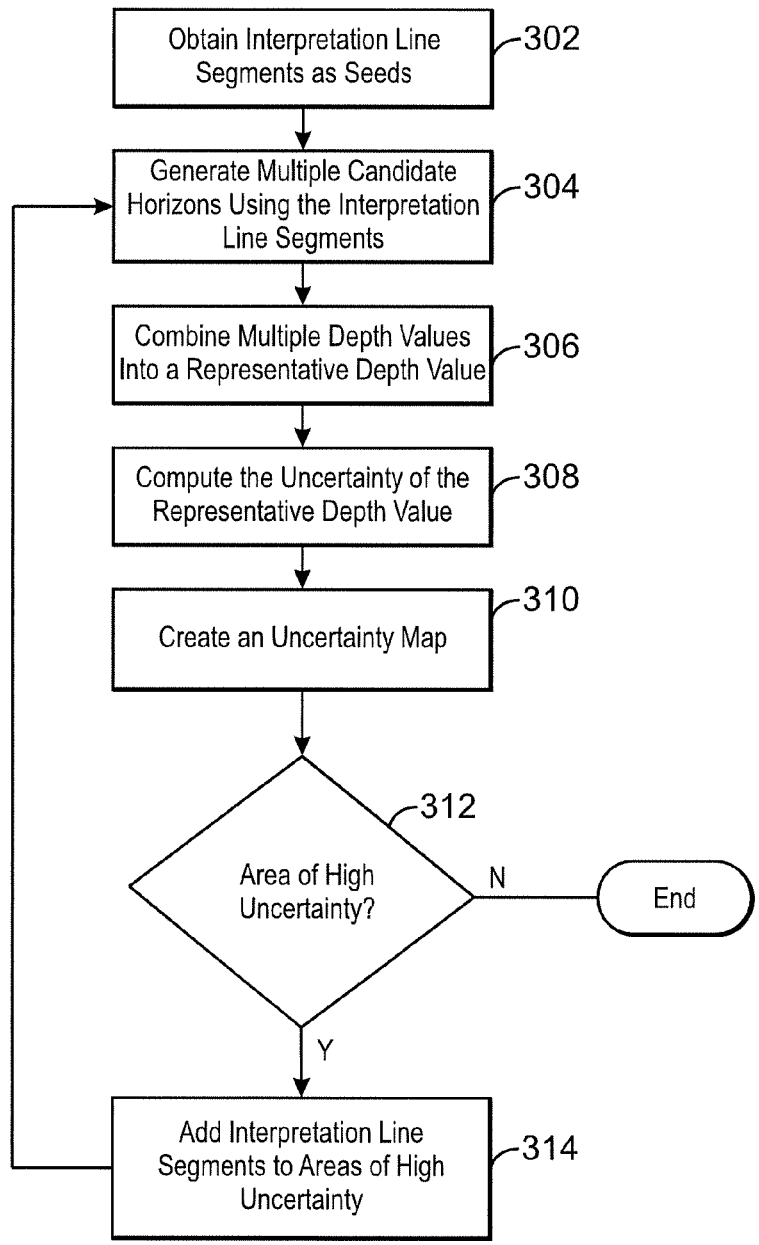
FIG. 3 is a process flow diagram of a method of generating and combining multiple horizons and computing uncertainty according to an embodiment of the present techniques.

FIG. 3 is a process flow diagram 300 summarizing a method of generating and combining multiple horizons and computing uncertainty according to an embodiment of the present techniques. At block 302, seeds may be obtained in the form of interpretation line segments. The interpretation line segments may be contained in in-line and cross-line sections of a seismic volume and may form a two dimensional area within a seismic volume. In embodiments, interpretation line segments may be in any direction and not limited to in-line and cross-line sections of a seismic volume. At block 304, multiple candidate horizons can be generated using the multiple interpretation line segments. A user may select interpretation line segments within a desired horizon surface in order to generate a horizon within a particular surface. Further, a candidate horizon may be generated using any seismic horizon tracking method from multiple interpretation line segments. Through the tracking of multiple candidate horizons, multiple depth values can be generated at each x-y location within the seismic volume. Horizon tracking may be performed in any seismic cross section from a given seed point or multiple seed points. Moreover, horizon tracking can be performed in a 3D space.

At block 306, multiple depth values from multiple candidate horizons can be combined at each x-y location. In order to combine the multiple depth values, the values can be averaged to compute a representative depth value at each x-y location. The multiple depth values can also be used to compute a degree of consistency at each x-y location as described herein. At block 308, the discrepancy among the depth values may be used to compute the uncertainty associated with the representative depth value. At block 310, an uncertainty map may be created. At block 312, it may be determined if the uncertainty map has any areas of high uncertainty. If areas of high uncertainty exist, the process flow continues to block 314. If areas of high uncertainty do not exist, the process flow ends. At block 314, interpretation line segments may be added to the areas of high uncertainty within the uncertainty map. Process flow may then return to block 304.

Figure 4A:
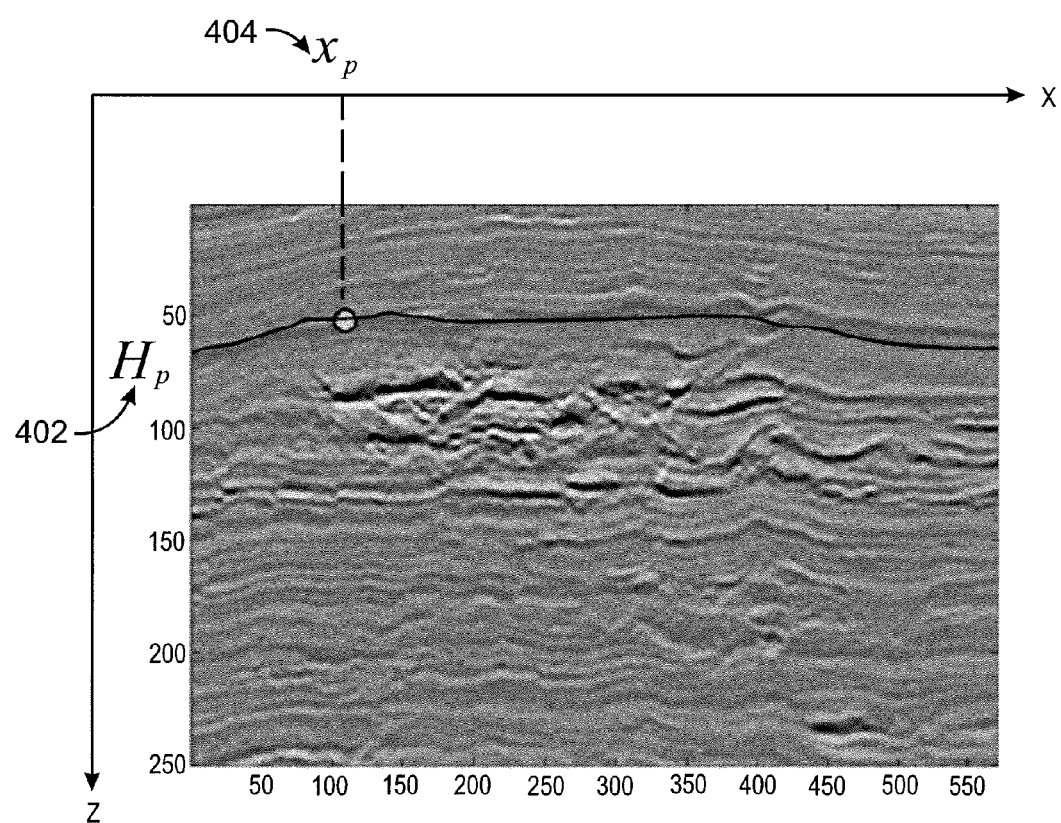
FIG. 4A is a diagram showing an example horizon obtained by using a horizon tracking method beginning with a seed in an in-line cross section according to an embodiment of the present techniques.

FIG. 4A is a diagram 400 showing an example horizon obtained by using a horizon tracking method beginning with a seed in an in-line cross section according to an embodiment of the present techniques. A horizon may be generated from a seed as described at block 204 (FIG. 2) or block 304 (FIG. 3). The horizon $H_p$ at reference number 402 is found using a horizontal tracking technique starting from the seed at $x_p$, shown at reference number 404. Although the seed at $x_p$ is shown as a single point in a 2D x-z plane, it may extend throughout a 3D volume as a interpretion line segment across all y values.

Figure 4B:
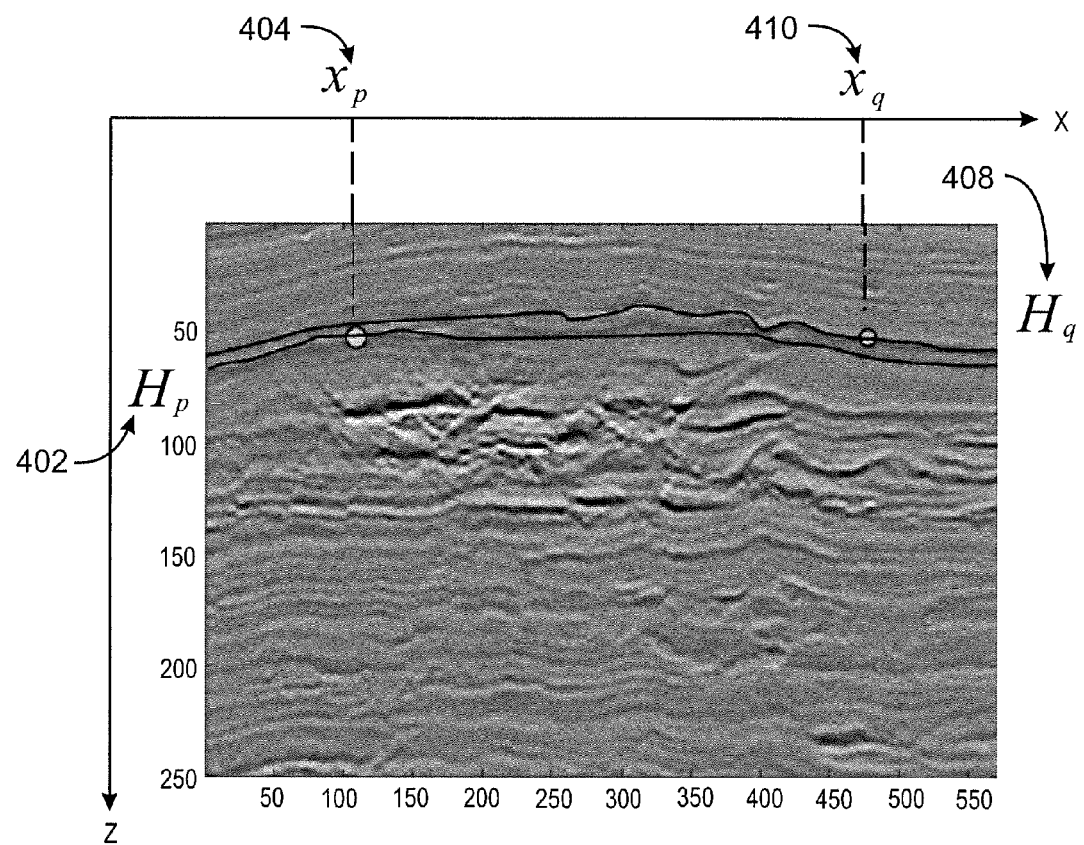
FIG. 4B is a diagram showing two example horizons obtained by using a horizon tracking method beginning with two seeds in an in-line cross section according to an embodiment of the present techniques.

FIG. 4B is a diagram 406 showing two example horizons obtained by using a horizon tracking method beginning with two seeds in an in-line cross section according to an embodiment of the present techniques. Each horizon may be generated from a seed as described at block 204 (FIG. 2) or block 304 (FIG. 3). Diagram 406 shows the horizon $H_p$, at reference number 402, that was found using a horizon tracking technique starting from the seed at $x_p$ shown at reference number 404, as well as an additional horizon $H_q$, at reference number 408, that was found using a horizontal tracking technique starting from the seed at $x_q$ shown at reference number 410. Through the present techniques, horizons $H_p$ and $H_q$ may be combined and a value for uncertainty associated with the combined horizons may be computed. In embodiments, consistency between the horizons $H_p$ and $H_q$ may be measured. As noted in FIGS. 4A and 4B, the seed used to track a horizon is not limited to a single point.

Figure 5:
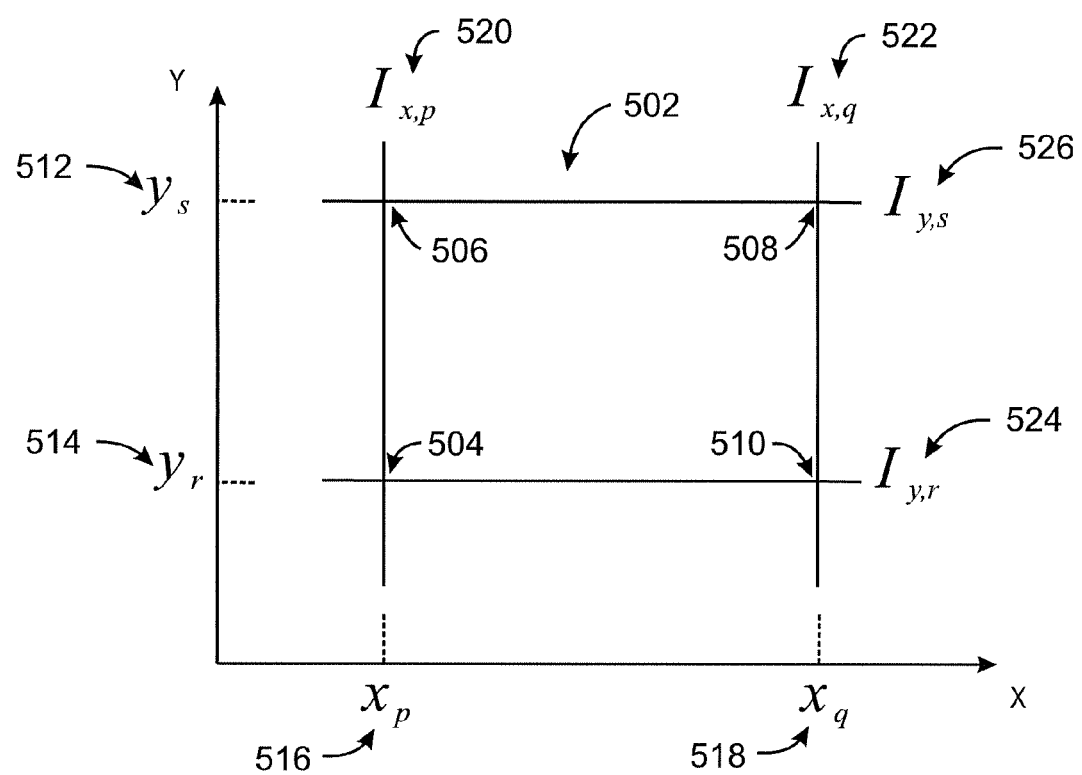
FIG. 5 is a diagram showing a top view of a seismic volume with two in-lines and two cross-lines as boundaries according to an embodiment of the present techniques.

FIG. 5 is a diagram 500 showing a top view of a seismic volume with two in-lines and two cross-lines as boundaries according to an embodiment of the present techniques. The area may be defined by point $(x_p, y_r)$, at reference number 504, point $(x_p, y_s)$, at reference number 506, point $(x_q, y_s)$, at reference number 508, and point $(x_q, y_r)$, at reference number 510. An in-line vertical cross section at reference number 512 may be represented by $y_s$, while another in-line vertical cross section at reference number 514 may be represented by $y_r$. A cross-line vertical cross section at reference number 516 may be represented by $x_p$, while another in-line vertical cross section at reference number 518 may be represented by $x_q$.

Two candidate horizons may be tracked from the two interpretation line segments in the two in-line vertical seismic sections, specifically interpretation line segment $I_{x,p}$ at reference number 520 and interpretation line segment $I_{x,q}$ at reference number 522. An additional two candidate horizons may be tracked starting from the two interpretation segments in two cross-lines vertical seismic sections, specifically, interpretation line segment $I_{y,r}$ at reference number 524 and $I_{y,s}$ at reference number 526. The four candidate horizons within interpretation line segments at reference numbers 520, 522, 524, and 526 may each have differing depth values, or z values, not viewable in the x-y view of diagram 500.

The four depth values at a particular x-y location $(x_i, y_j)$ may be denoted as $z_{i,j}(x, p), z_{i,j}(x,q), z_{i,j}(y,r),$ and $z_{i,j}(y, s)$ such that $z_{i,j}(x, p)$ is the z value at $(x_i, y_1)$ from the horizon constructed by the horizon tracking algorithm from the seed interpretation line segment $I_{x,p}$. Similarly, $z_{i,j}(x, q)$ is the z value at $(x_i, y_j)$ from the horizon constructed by the horizon tracking algorithm from the seed interpretation line segment $I_{x,q}$. Likewise, $z_{i,j}(y, r)$ is the z value at $(x_i, y_j)$ from the horizon constructed by the horizon tracking algorithm from the seed interpretation line segment $I_{y,r}$. Finally, $z_{i,j}(y, s)$ is the z value at $(x_i, y_j)$ from the horizon constructed by the horizon tracking algorithm from the seed interpretation line segment $I_{y,s}$.

The four depth values may be combined to find a representative depth value $z_{i,j}$ through averaging using Equation (1a), where $$z_{i,j} = \frac{\sum_{n=1}^{n=4} z_{i,j,n}}{4} \quad (1a)$$

and $z_{i,j,1}=z_{i,j}(x, p), z_{i,j,2}=z_{i,j}(x, q), z_{i,j,3}=z_{i,j}(y, r),$ and $z_{i,j,4}=z_{i,j}(y, s)$.

The uncertainty $u_{i,j}$ may be found as in Equation (1b), where $$u_{i,j} = \text{standard deviation of } (z_{i,j,n}), n=1, 2, 3, 4 \quad (1b)$$

Another technique to combine the four depth values into a representative depth value is by finding a weighted average $z_{i,j}$ of the four depth values using their distance and error as in Equation (2a):

$$z_{i,j} = \sum_{n=1}^{n=4} z_{i,j,n} * w_{i,j,n} / \sum_{n=1}^{n=4} w_{i,j,n} \quad (2a)$$

where $w_{i,j,n}$ is the weight of each depth value. Each weight may be found as in Equation (2b):

$$w_{i,j,n} = 1./(e_{i,j,n} * e_{i,j,n} * d_{i,j,n} * d_{i,j,n}). \, n=1, 2, 3, 4 \quad (2b)$$

Error may be represented as $e_{i,j,n}$, and may be found as in Equations (2c) and (2d)

$$e_{i,j,1} = e_{i,j,2} = z_{i,j,1} - z_{i,j,2} \quad (2c)$$

$$e_{i,j,3} = e_{i,j,4} = z_{i,j,3} - z_{i,j,4} \quad (2d)$$

where $z_{i,j,1}=z_{i,j}(x, p), z_{i,j,2}=z_{i,j}(x, q), z_{i,j,3}=z_{i,j}(y, r),$ and $z_{i,j,4}=z_{i,j}(y, s)$.

Distance $d_{i,j,n}$ is the distance between $(x_i, y_j)$ and the points within interpretation line segments $I_{x,p}, I_{x,q}, I_{y,r},$ and $I_{y,s}$ for n=1, 2, 3, and 4. Using the weighted average, the uncertainty $u_{i,j}$ may be found as in Equations (2e) and (2f):

$$u_{i,j} = \sum_{n=1}^{n=4} u_{i,j,n} * w_{i,j,n} / \sum_{n=1}^{n=4} w_{i,j,n} \quad (2e)$$

$$u_{i,j,n} = |z_{i,j} - z_{i,j,n}| * w_{i,j,n} \quad (2f)$$

The representative depth value may also be found using a comparison of the consistency of the depth values. When depth values are found that "match," the representative depth value, $z_{i,j}$, may be computed as an average of the matching depth values.

Typically, with actual seismic amplitude data, it is uncommon to have equal values of $z_{i,j,n}$, for n=1, 2, 3, and 4, due to differing seismic patterns and amplitude noise in four directions within the seismic volume. Therefore, two horizon depth values at a location $(x_i, y_j)$ can "match" one another if their difference is less than or equal to a tracking error tolerance $e_{tol}$. As used herein, "matching" conveys a condition where two depth values are within the tracking error tolerance, and may be shown using the approximately equal symbol "≈". Further, the two depth values may match, but are not necessarily the same or equal. For example, when two pairs of depth values are equal, such that $z_{i,j,1}=z_{i,j,2}$, and $z_{i,j,2}=z_{i,j,3}$, then $z_{i,j,1}=z_{i,j,3}$ will be true as well. However when two pairs of depth values match, such that $z_{i,j,1}≈z_{i,j,2}$ and $z_{i,j,2}≈z_{i,j,3}$, then $z_{i,j,1}≈z_{i,j,3}$ may or may not be true.

Figure 6:
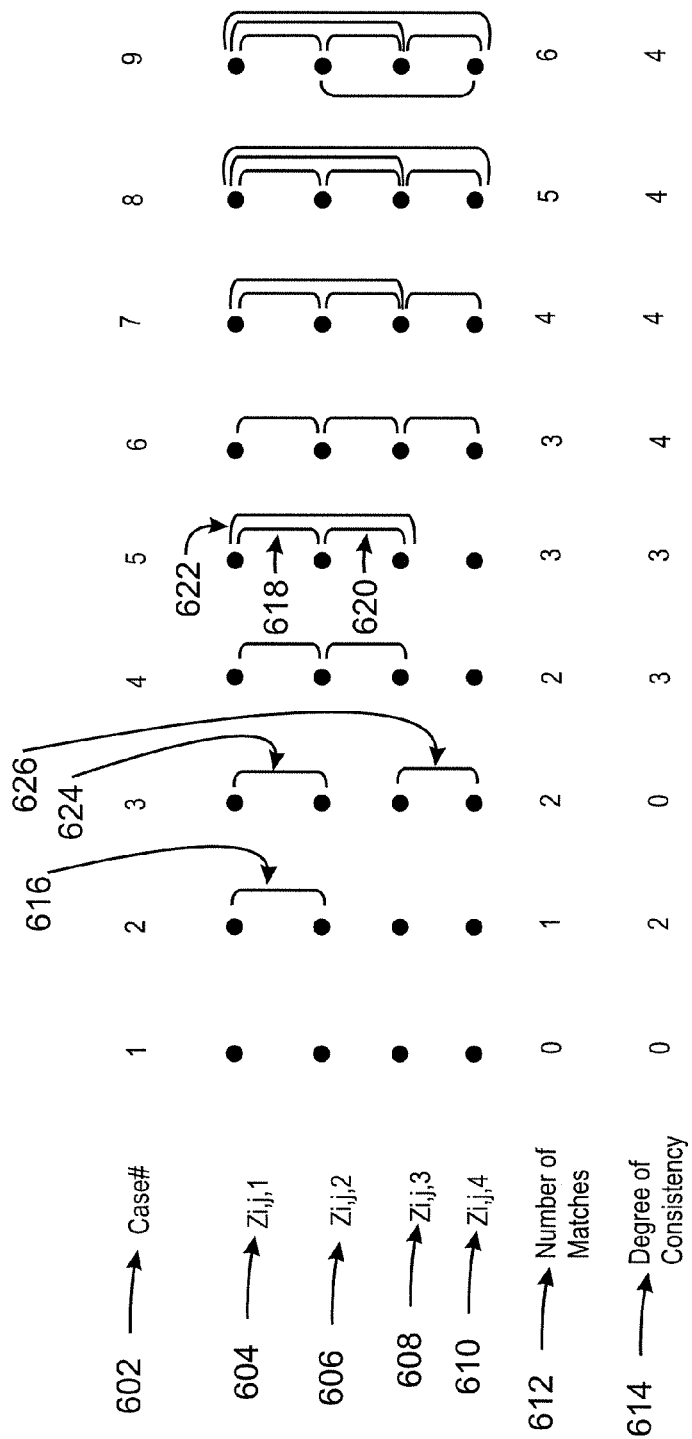
FIG. 6 is a diagram of matching relationships according to an embodiment of the present techniques.

FIG. 6 is a diagram 600 of matching relationships according to an embodiment of the present techniques. At reference number 602, there is a row of values indicating the case number for each matching scenario. The various matching relationships may be shown in the columns below each case number at reference number 602. At reference number 604, the depth value at $z_{i,j,1}$ is represented in each case by a black dot. Similarly, at reference number 606, the depth value at $z_{i,j,2}$ is represented in each case by a black dot. Likewise, at reference number 608, the depth value at $z_{i,j,3}$ is represented in each case by a black dot. Finally at reference number 610, the depth value at $z_{i,j,4}$ is represented in each case by a black dot. In the row at reference number 612, the number of matches is indicated for each matching scenario within the column of the corresponding case number at reference number 602. In the row at reference number 614, a degree of consistency is indicated for each matching relationship.

In diagram 600, a match is indicated by a line from one black dot in one row of a depth value to another black dot in another row of another depth value. For example, in the column under case two, a match is indicated by the line at reference number 616 from the black dot in row 604 to the black dot in row 606. Thus, in case two, the depth value $z_{i,j,1}$ matches the depth value $z_{i,j,2}$. The one match in case two is indicated in row 612, where the number of matches in the column under case two is equal to 1. The degree of consistency in row 614 is equal to two in case two, indicating that two of the depth values are matching each other.

Similarly, in the column under case five, three matches are indicated by lines 618, 620, and 622. In case five, the depth value $z_{i,j,1}$ matches the depth value $z_{i,j,2}$, as indicated by line 618. Further, the depth value $z_{i,j,2}$ matches the depth value $z_{i,j,3}$, as indicated by line 620. Finally, the depth value $z_{i,j,1}$ matches the depth value $z_{i,j,3}$, as indicated by line 622. The three matches in case five are indicated in row 612, where the number of matches in the column under case five is equal to 3. The degree of consistency in row 614 is equal to three, indicating that three of the depth values are consistent with one another in case five.

Generally, when there are more matches among depth values $z_{i,j}$, a higher consistency may be assigned. An exception to generality is case three, where there are two matches, as indicated by lines 624 and 626. The two sets of matches indicated by lines 624 and 626 are separated by more than $e_{tol}$, as indicated by a lack of lines connecting the two sets of matches indicated by lines 624 and 626. Since the two matches are separated by more than $e_{tol}$, there is no match between the depth values of the two sets of matches and case three is assigned degree zero consistency. From the matching depth values, the representative depth value, $z_{i,j}$, may be computed as an average of the depth values that are matching one another, as shown in each case of FIG. 6.

For ease of discussion, the present techniques have been described using two in-line and two cross-line interpretation line segments. However, any number of interpretation line segments may be used, and the interpretation line segments are not restricted to in-line and cross-line directions. FIG. 7A is a map view 700 showing an area 702 with multiple in-lines and cross-lines as according to an embodiment of the present techniques. Interpretation line segment are shown at reference numbers 704, 706, 708, 710, and 712.

FIG. 7B is a map view 720 showing the number of depth values available at each x-y location based on the interpretation line segments in FIG. 7A according to an embodiment of the present techniques. For example, x-y locations within the cross-hatched area 722 each have four depth values, and x-y locations within each unshaded area 724 have three depth values. The x-y locations within the darkened areas 726 each have two depth values, and the x-y locations with the double-cross-hatched areas 728 each have a single depth value.

In the areas with more than one depth value such as the cross-hatched areas 722, the unshaded areas 724, and the darkened areas 726, the techniques presently described may be performed with various numbers of depth values. In areas with a single depth value, such as double-cross-hatched areas 728, a horizon depth may be computed without an associated measurement of uncertainty or degree of consistency.

Figure 8A:
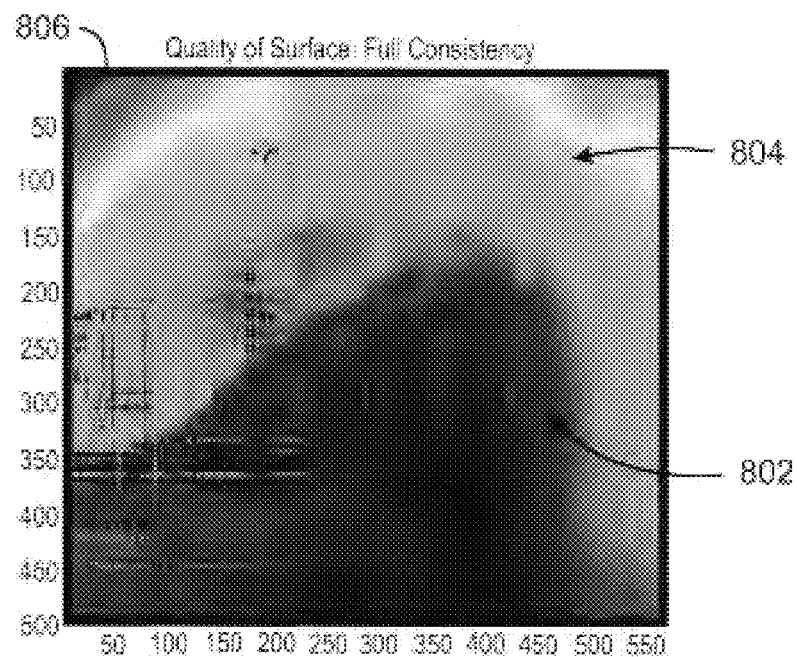
FIG. 8A is a top view of a depth map of a horizon surface constructed based on four interpretation line segments according to an embodiment of the present techniques.

FIG. 8A is a top view 800 of a depth map of a horizon surface constructed based on four interpretation line segments according to an embodiment of the present techniques. Top view 800 includes two inline interpretation line segments, $I_{y,1}$ and $I_{y,500}$, and two cross line interpretation line segments, namely $I_{x,1}$ and $I_{x,571}$, as seeds. The depth of the horizon is shaded with a medium shading at reference number 802, a lighter shading at reference number 804, and darker shading at reference number 806.

Figure 8B:
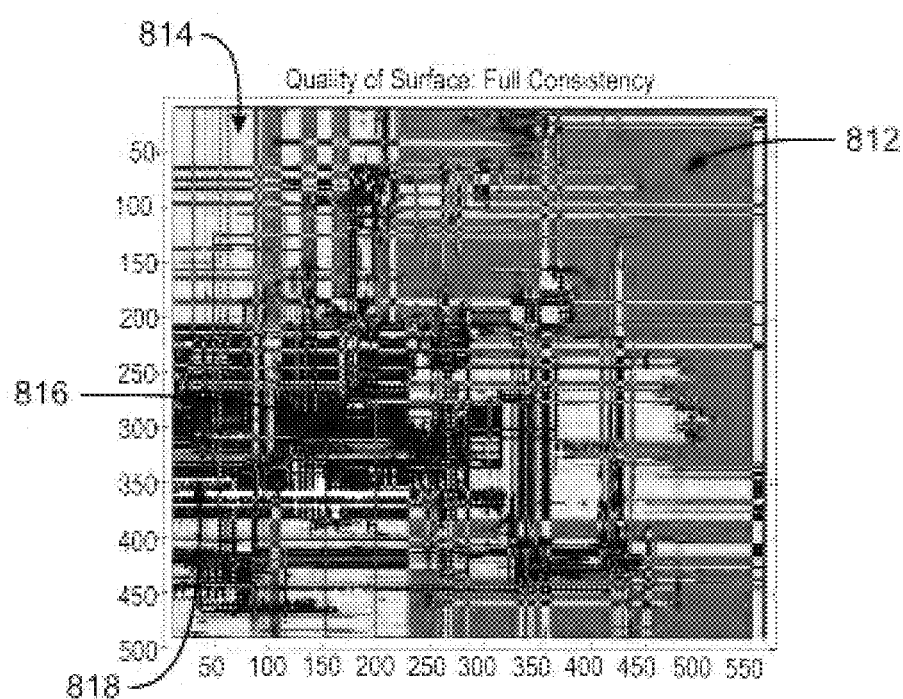
FIG. 8B is a top view of a consistency map of the horizon surface according to an embodiment of the present techniques.

FIG. 8B is a top view 810 of a consistency map of the horizon surface according to an embodiment of the present techniques. The areas at reference number 812 represent full consistency among the depth values found at each point according to embodiments of the present techniques. The areas at reference number 814 represent a degree of consistency of three among the depth values found at each point according to embodiments of the present techniques. The areas at reference number 816, represent a degree of consistency of two among the depth values found at each point according to embodiments of the present techniques. The areas at reference number 818 represent a degree of consistency of zero among the depth values found at each point according to embodiments of the present techniques.

Table 1 shows the degree of consistency of FIG. 8B and the error rate observed from the horizon surface constructed as compared to a manually interpreted seismic horizon.

TABLE 1

| Degree of Consistency and Corresponding Accuracy | | | |
|---|---|---|---|
| Consistency | Number of points | Number of errors | Percentage of error |
| 4 | 113,028 (39.9%) | 298 | 0.26 |
| 3 | 89,135 (31.5%) | 985 | 1.1 |
| 2 | 25,061 (8.8%) | 3,388 | 13.5 |
| 0 | 56,142 (19.8%) | NA | NA |

The first row shows that, out of total 285,500 horizon surface points, 113,028 points have full consistency and only 298 points with full consistency differ from manual interpretations by more than $e_{tol}$ voxels, where $e_{tol}$ is three. Thus, when the degree of consistency is four, there is a 0.26% error rate. Accordingly, if a location has a degree of consistency of four, the depth of the location will be correct with a probability of 0.9974. The second row states that, out of total 285,500 horizon surface points, 89,135 points have degree of consistency of three. For a degree of consistency of three, the error rate increases to 1.1%, meaning that a degree of consistency of three will be correct with a probability of 0.99. For a point with a degree of consistency of two, the probability of error increases to 13.5%.

Thus, a constructed horizon has less than 1.1% error when the degree of consistency is at least 3 or 4. Additional interpretation line segments can be placed into one or more vertical cross sections in the areas of low consistency. Then, iteratively repeating the techniques in FIG. 2 or 3 may update the horizon, the consistency map, and the overall model of the subsurface region. The new consistency map can be used to further refine the horizon.

Figure 9:
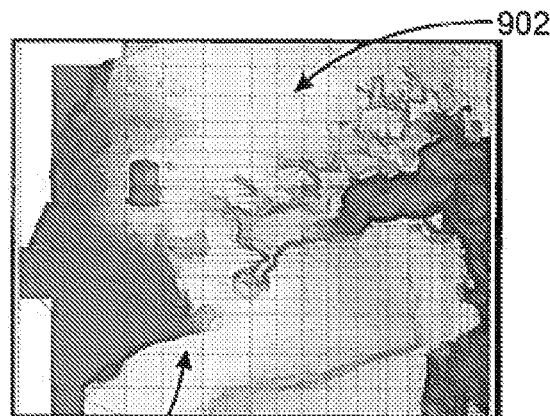
FIG. 9 is a top view of a map of depth values of a horizon in a subsurface formation obtained according to an embodiment of the present techniques.

FIG. 9 is a top view of a map 900 of depth values of a horizon in a subsurface formation obtained according to an embodiment of the present techniques. When computing uncertainty, Equations (2a) through (2f) may be used. Here, the z values found with equations (2a) through (2f) are represented in grey scale. Input seed points are in the form of interpretation line segments within in multiple in-lines and cross-line sections. The in-lines are shown as black vertical lines 902 and the cross lines are shown as black horizontal lines 904.

Figure 10:
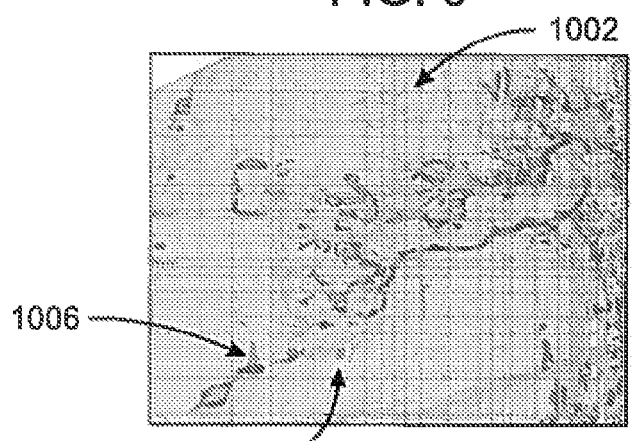
FIG. 10 is an uncertainty map according to an embodiment of the present techniques.

FIG. 10 is an uncertainty map 1000 according to an embodiment of the present techniques. The uncertainty map 1000 includes in-lines 1002 and cross lines 1004. The darker grey areas, such as the area at reference number 1006 represents high uncertainty. When analyzing the uncertainty map, additional interpretation lines may be added in the areas where uncertainty is high. High uncertainty occurs mostly along geologically complex area, where automated horizon tracker fails to follow a complex horizon. The techniques described in FIGS. 2 and 3 may be used to remove the uncertainty in the area by adding more interpretation lines.

Figure 11:
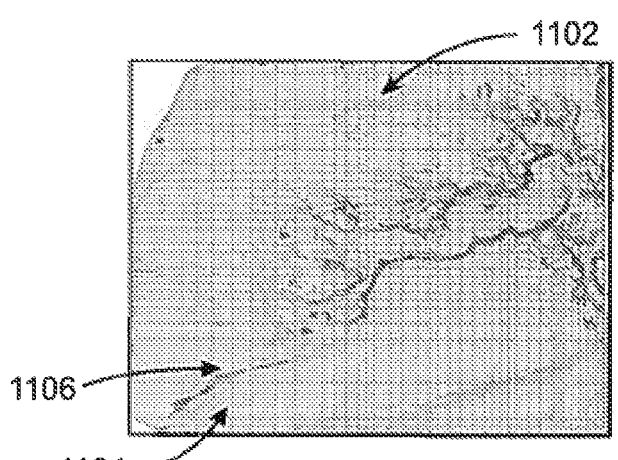
FIG. 11 is an uncertainty map with additional interpretation lines according to an embodiment of the present techniques.

FIG. 11 is an uncertainty map 1100 with additional interpretation lines according to an embodiment of the present techniques. Uncertainty map 1100 is updated from uncertainty map 1000 (FIG. 10) as a result of the additional interpretation lines. Thus, uncertainty map 1100 contains more in-lines 1102 and more cross-lines 1104 when compared to the uncertainty map 1000 (FIG. 10). The area at reference number 1106 shows less grey and less uncertainty when compared to the area at reference number 1006 (FIG. 10).

Figure 12:
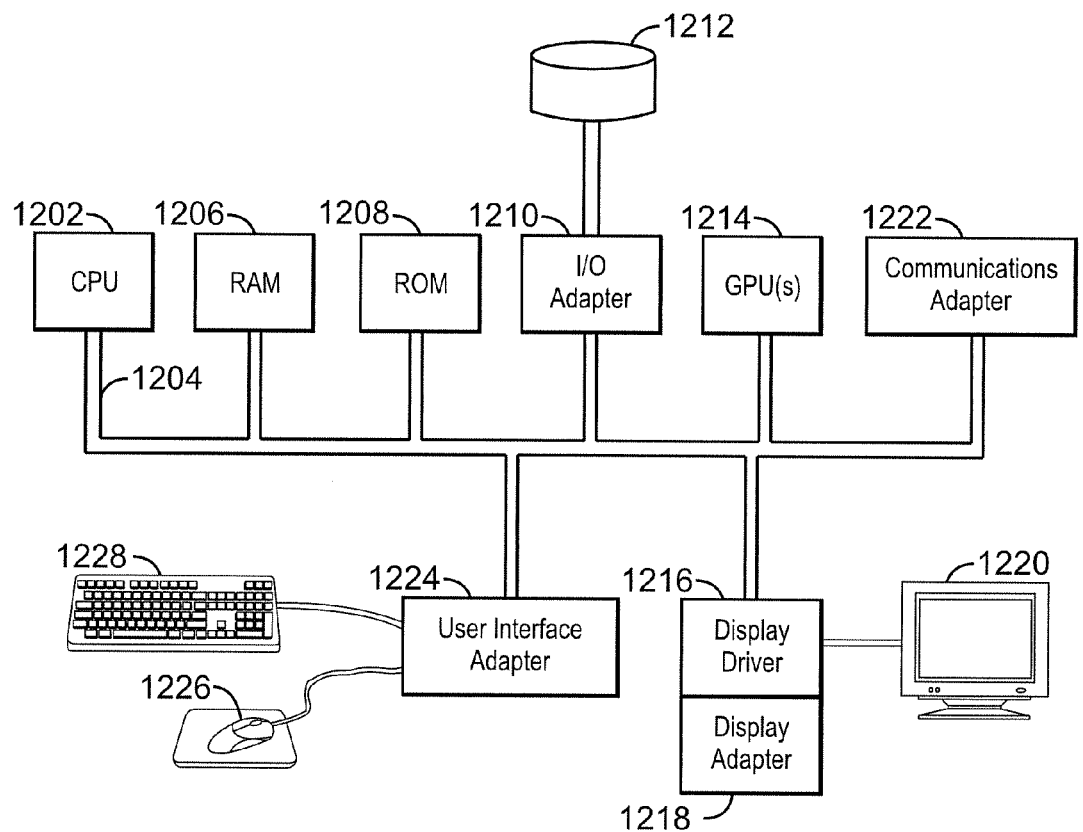
FIG. 12 is a block diagram of a computer system that may be used to generate candidate horizons, combine the candidate horizons, and compute uncertainty according to an embodiment of the present techniques.

FIG. 12 is a block diagram of a computer system 1200 that may be used to generate candidate horizons, combine the candidate horizons, and compute uncertainty according to an embodiment of the present techniques. A central processing unit (CPU) 1202 is coupled to system bus 1204. The CPU 1202 may be any general-purpose CPU, although other types of architectures of CPU 1202 (or other components of exemplary system 1200) may be used as long as CPU 1202 (and other components of system 1200) supports the operations as described herein. Those of ordinary skill in the art will appreciate that, while only a single CPU 1202 is shown in FIG. 12, additional CPUs may be present. Moreover, the computer system 1200 may include a graphics processing unit (GPU) 1214. The system may comprise a networked, multi-processor computer system that may include a hybrid parallel CPU/GPU system. The CPU 1202 and GPU 1214 may execute logical instructions according to various exemplary embodiments. For example, the CPU 1202 may execute instructions in parallel with GPU 1214 for performing processing according to the operational flow described above in conjunction with FIGS. 2-3. The processing described may be performed in parallel.

The computer system 1200 may also include computer components such as non-transitory, computer-readable media. Examples of computer-readable media include a random access memory (RAM) 1206, which may be SRAM, DRAM, SDRAM, or the like. The computer system 1200 may also include additional non-transitory, computer-readable media such as a read-only memory (ROM) 1208, which may be PROM, EPROM, EEPROM, or the like. RAM 1206 and ROM 1208 hold user and system data and programs, as is known in the art. The computer system 1200 may also include an input/output (I/O) adapter 1210, a communications adapter 1222, a user interface adapter 1224, a display driver 1216, and a display adapter 1218. The I/O adapter 1210, the user interface adapter 1224, and/or communications adapter 1222 may, in certain embodiments, enable a user to interact with computer system 1200 in order to input information.

The I/O adapter 1210 may connect additional non-transitory, computer-readable media such as a storage device(s) 1212, including, for example, a hard drive, a compact disc (CD) drive, a floppy disk drive, a tape drive, and the like to computer system 1200. The storage device(s) may be used when RAM 1206 is insufficient for the memory requirements associated with storing data for operations of embodiments of the present techniques. The data storage of the computer system 1200 may be used for storing information such as horizon tracking data and/or other data used or generated as disclosed herein. User interface adapter 1224 couples user input devices, such as a keyboard 1228, a pointing device 1226 and/or output devices to the computer system 1200. The display adapter 1218 is driven by the CPU 1202 to control the display on a display device 1220 to, for example, display information or a representation pertaining to a simulation, such as uncertainty maps, resulting from calculations according to certain exemplary embodiments.

The architecture of system 1200 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method of generating a horizon surface based on multiple candidate horizon surfaces, the method comprising:
   selecting seeds that represent different starting locations within a desired horizon surface;
   generating a plurality of candidate horizons from the selected seeds;
   generating the horizon surface by combining, for each point on the horizon surface, depth values from corresponding points on the plurality of candidate horizons into a single representative depth value;
   computing an uncertainty for each point on the horizon surface based on a difference between two or more depth values from the plurality of candidate horizons that create the single representative depth value, respectively; and
   creating a model of the subsurface region using the horizon surface.

2. The method recited in claim 1, wherein the seeds include interpretation line segments with differing lengths, interpretation line segments that are not in-line or cross-line segments, or points.

3. The method recited in claim 1, wherein the model of the subsurface region includes a consistency map and an uncertainty map.

4. The method recited in claim 1, comprising:
   combining, for each point on the horizon surface, the depth values into the single representative depth value using an average of the depth values, respectively; and
   computing the uncertainty as a standard deviation of the depth values used to generate the single representative depth value, respectively.

5. The method recited in claim 1, comprising:
   combining, for each point on the horizon surface, the depth values into the single representative depth value using a weighted average of the depth values, respectively, with a weight computed using a distance calculation and an error calculation; and computing the uncertainty as a standard deviation of the depth values used to generate the single representative depth value, respectively.

6. The method recited in claim 1, comprising:

combining, for each point on the horizon surface, depth values into the single representative depth value using an average of a matching set of depth values at each location, respectively;

computing the uncertainty as a standard deviation of the depth values used to generate the single representative depth value, respectively.

7. The method recited in claim 1, comprising iteratively creating an uncertainty map or a consistency map, using additional interpretation lines on the uncertainty map or the consistency map in each iteration to refine the depth values.

8. A computer system that is configured to generate a horizon surface based on multiple candidate surfaces, the computer system comprising:

a processor; and a non-transitory, machine-readable storage medium that stores machine-readable instructions for execution by the processor, the machine-readable instructions comprising:

code that is configured to cause the processor to select seeds that represent different starting locations within a desired horizon surface;

code that is configured to cause the processor to generate a plurality of candidate horizons from the selected seeds;

code that is configured to cause the processor to generate the horizon surface by combining, for each point on the horizon surface, depth values from corresponding points on the plurality of candidate horizons into a single representative depth value;

code that is configured to cause the processor to compute an uncertainty for each point on the horizon surface based on a difference between two or more depth values from the plurality of candidate horizons that create the single representative depth value, respectively; and code that is configured to cause the processor to render a model of the subsurface region using the horizon surface.

9. The system recited in claim 8, wherein the seeds include interpretation line segments with differing lengths, interpretation line segments that are not in-line seismic sections or cross-line seismic sections, or points.

10. The system recited in claim 8, comprising code that is configured to cause the processor to render the model of the subsurface region by rendering a consistency map and an uncertainty map.

11. The system recited in claim 8, comprising code that, when executed by the processor, is configured to cause the processor to combine, for each point on the horizon surface, the depth values into the single representative depth value using an average of the depth values, respectively, and compute the uncertainty as a standard deviation of the depth values used to generate the single representative depth value, respectively.

12. The system recited in claim 8, comprising code that is configured to cause the processor to combine, for each point on the horizon surface, the depth values into the single representative depth value using a weighted average of the depth values, respectively, with a weight computed using a distance calculation and an error calculation, and compute the uncertainty as a standard deviation of the depth values used to generate the single representative depth value, respectively.

13. The system recited in claim 8, comprising code that is configured to cause the processor to combine the depth values into the representative depth value using an average of a matching set of depth values at each location and compute the uncertainty as a standard deviation of the depth values at used to generate the single representative depth value, respectively.

14. The system recited in claim 8, comprising code that, when executed by the processor, is configured to cause the processor to render a model of the subsurface region using the uncertainty by iteratively creating an uncertainty map or a consistency map, using additional interpretation lines on the uncertainty map or the consistency map in each iteration to refine the depth values.

15. A non-transitory, computer readable medium comprising code, which when executed by a processor causes the processor to execute a method of generating a horizon surface based on multiple candidate horizon surfaces, the method comprising:

selecting seeds that represent different starting locations within a desired horizon surface;

generating a plurality of candidate horizons from the selected seeds;

generating the horizon surface by combining, for each point on the horizon surface, depth values from corresponding points on the plurality of candidate horizons into a representative depth value;

computing an uncertainty for each point on the horizon surface based on a difference between two or more depth values from the plurality of candidate horizons that create the single representative depth value, respectively; and creating a model of the subsurface region using the horizon surface.

16. The non-transitory, computer readable medium recited in claim 15, wherein the seeds include interpretation line segments with differing lengths, interpretation line segments that are not in-line seismic sections, cross-line seismic sections, or points.

17. The non-transitory, computer readable medium recited in claim 15, comprising code configured to direct a processor to combine, for each point on the horizon surface, the depth values into the single representative depth value using an average of the depth values, respectively, and compute the uncertainty as a standard deviation of the depth values used to generate the single representative depth value, respectively.

18. The non-transitory, computer readable medium recited in claim 15, comprising code configured to direct a processor to combine, for each point on the horizon surface, the depth values into the single representative depth value using a weighted average of the depth values, respectively, with a weight computed using a distance calculation and an error calculation, and compute the uncertainty as a standard deviation of the depth values used to generate the single representative depth value, respectively.

19. The non-transitory, computer readable medium recited in claim 15, comprising code configured to direct a processor to combine, for each point on the horizon surface, the depth values into the single representative depth value using an average of a matching set of depth values at each location, respectively and compute the uncertainty as a standard deviation of the depth values used to generate the single representative depth value, respectively.

20. The non-transitory, computer readable medium recited in claim 15, comprising code configured to direct a processor to create a model of the subsurface region using the uncertainty by iteratively creating an uncertainty map or a consistency map, using additional interpretation lines on the uncertainty map or the consistency map in each iteration to refine the depth values.

* * * * *